US009766077B2

(12) United States Patent
Silfven et al.

(10) Patent No.: US 9,766,077 B2
(45) Date of Patent: Sep. 19, 2017

(54) NAVIGATIONAL GUIDANCE FOR CROSSING A BOUNDARY LINE

(71) Applicant: Garmin Switzerland GmbH, Schaffhausen (CH)

(72) Inventors: Jan O. Silfven, Upplands Vaesby (SE); Ravinder Singh, Olathe, KS (US); David L. Gepner, Olathe, KS (US); Kyle A. Chappell, Lenexa, KS (US)

(73) Assignee: Garmin Switzerland GmbH (CH)

( * ) Notice: Subject to any disclaimer, the term of this patent is extended or adjusted under 35 U.S.C. 154(b) by 172 days.

(21) Appl. No.: 14/866,495

(22) Filed: Sep. 25, 2015

(65) Prior Publication Data
US 2016/0091318 A1 Mar. 31, 2016

Related U.S. Application Data

(60) Provisional application No. 62/057,431, filed on Sep. 30, 2014.

(51) Int. Cl.
*G01C 21/20* (2006.01)
*G01C 21/10* (2006.01)
(Continued)

(52) U.S. Cl.
CPC ............ *G01C 21/203* (2013.01); *B63B 49/00* (2013.01); *B63B 51/00* (2013.01); *G01C 21/10* (2013.01);
(Continued)

(58) Field of Classification Search
CPC ...... G01C 21/203; G01C 21/10; B63B 49/00; B63B 51/00; A63B 71/0686; A63B 71/06; B63J 2099/008; G01S 19/19
See application file for complete search history.

(56) References Cited

U.S. PATENT DOCUMENTS 5,731,788 A * 3/1998 Reeds .................. G01S 19/41
340/323 R
2013/0054138 A1* 2/2013 Clark .................. G01C 21/203
701/468
(Continued)

OTHER PUBLICATIONS

Printout from https://itunes.apple.com/us/app/sailboat-race-starter-regatta/id389983096?mt=8 published prior to Sep. 25, 2015.
(Continued)

*Primary Examiner* — Abby Lin
(74) *Attorney, Agent, or Firm* — Samuel M. Korte; Max M. Ali

(57) ABSTRACT

A navigation device is disclosed that provides navigational guidance to boats needing to cross a boundary line at a milestone event time. Port and starboard laylines and guidelines may be displayed with the boundary line using wind direction data. The port and starboard layline angles may change with the wind direction, while their lengths may represent a distance traversed by the boat tacking at the port and starboard layline angles for a target time period at a target speed. A predictor line may be displayed extending from the boat in the direction in which the boat is traveling and may have a length indicating a distance traversed by the boat at its current speed until the milestone event time. The predictor line length and color may provide feedback regarding whether the boat will cross the boundary too early or too late given its current speed and direction.

20 Claims, 8 Drawing Sheets

(51) Int. Cl.
- *B63B 51/00* (2006.01)
- *B63B 49/00* (2006.01)
- *B63J 99/00* (2009.01)
- *G01S 19/19* (2010.01)

(52) U.S. Cl.
CPC ......... *B63J 2099/008* (2013.01); *G01S 19/19* (2013.01)

(56) References Cited

U.S. PATENT DOCUMENTS

2015/0254910 A1* 9/2015 Summers ............... B63B 49/00 701/31.5
2016/0101341 A1* 4/2016 Faure ................. A63B 71/0686 700/91

OTHER PUBLICATIONS

Printout from http://www.expeditionmarine.com/about.htm published prior to Sep. 25, 2015.
Printout from http://www.bandg.com/Sailing-Features/RacePanel/ published prior to Sep. 25, 2015.
Printout from http://www.zifigo.com/?g=node/279 published prior to Sep. 25, 2015.

* cited by examiner

NAVIGATIONAL GUIDANCE FOR CROSSING A BOUNDARY LINE

CROSS-REFERENCE TO RELATED APPLICATIONS

The priority benefit of U.S. Provisional Patent Application No. 62/057,431, entitled "Method for Determining and Displaying Optimal Speed and Timing for Racing Sailors," filed on Sep. 30, 2014, is claimed and the disclosure of which is hereby incorporated by reference in its entirety.

BACKGROUND

In sailboat racing, the start line may be very crowded with boats vying for the most advantageous starting positions. The race starts at a precise start time that indicates when boats may cross a starting line. Crossing the starting line before this time will result in penalties, while crossing the starting line after this time will place the sailor behind in the race.

In other watersports, such as fishing, for example, boats need to cross a boundary line upon expiration of some time period. Crossing the boundary line before it is necessary to do so may result in less fish being caught, while crossing the boundary line too late may disqualify or penalize a competitor.

To provide assistance in crossing such boundary lines, conventional products may display the distance from the boundary line and a time indicating when the boat needs to cross the boundary line. But determining whether the boat is maintaining the proper speed and, in the case of sailboats, the correct tacking angle, requires complex and time consuming manual calculations. As a result, current devices that provide navigational guidance for boats in such scenarios have several drawbacks.

SUMMARY

Embodiments of the present technology relate generally to a navigation device and, more particularly, to a navigation device that calculates and displays various graphical elements and/or metrics to assist boats in crossing a boundary line at a desired time.

Embodiments are disclosed describing a navigation device that may display the location of a boundary line that a boat needs to cross at a specific time. The described embodiments of the navigation device may be utilized for any application in which a boundary line needs to be crossed at a specific time, such as sailboat racing, competitive fishing, etc.

In some embodiments, the navigation device may track and display a countdown timer or other time indicating the specific time the boat needs to cross the boundary line. The navigation device may determine, from the various sensor metrics, conditions that may impact the speed and direction of the boat traveling towards the boundary line, such as head wind speed and direction, tides and currents, the course and speed of the boat over ground, the geographic location of the boat and the boundary line, etc.

Using the metrics calculated from the sensor data, the navigation device may calculate and display information useful in the navigation of the boat from its current position in the water across the boundary line. For example, in sailboat racing embodiments, the navigation device may calculate and display port and starboard layline tacking angles indicating an optimum direction toward the boundary line for a particular head wind speed and direction. The port and starboard layline angles may have lengths associated therewith corresponding to the distance traversed by the sailboat for selected or predetermined periods of time (e.g., 30 seconds, 1 minute, etc.). The navigation device may display a guideline connecting the ends of the port and starboard laylines to act as a navigational aid.

Furthermore, embodiments include the navigation device calculating a current speed and direction of the boat using geographic location data and/or sensor data. Using this data, the navigation device may calculate and display a predictor line indicating the distance traversed by the boat traveling at the current speed in its current direction of travel for a period of time equal to the remaining time until a milestone event (e.g., the remaining time left on the race start timer). By comparing this distance to the distance between the boat and the boundary line location, the navigation device may determine whether the boat will cross the boundary line before or after the race starting time given its current direction and speed.

The navigation device may also change how the predictor line is displayed based upon whether the boat will cross the boundary line early or late by changing the color of the predictor line for each scenario. In this way, the navigation device simplifies calculations and provides feedback regarding the navigation of a boat under time-sensitive conditions.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Figure 1:
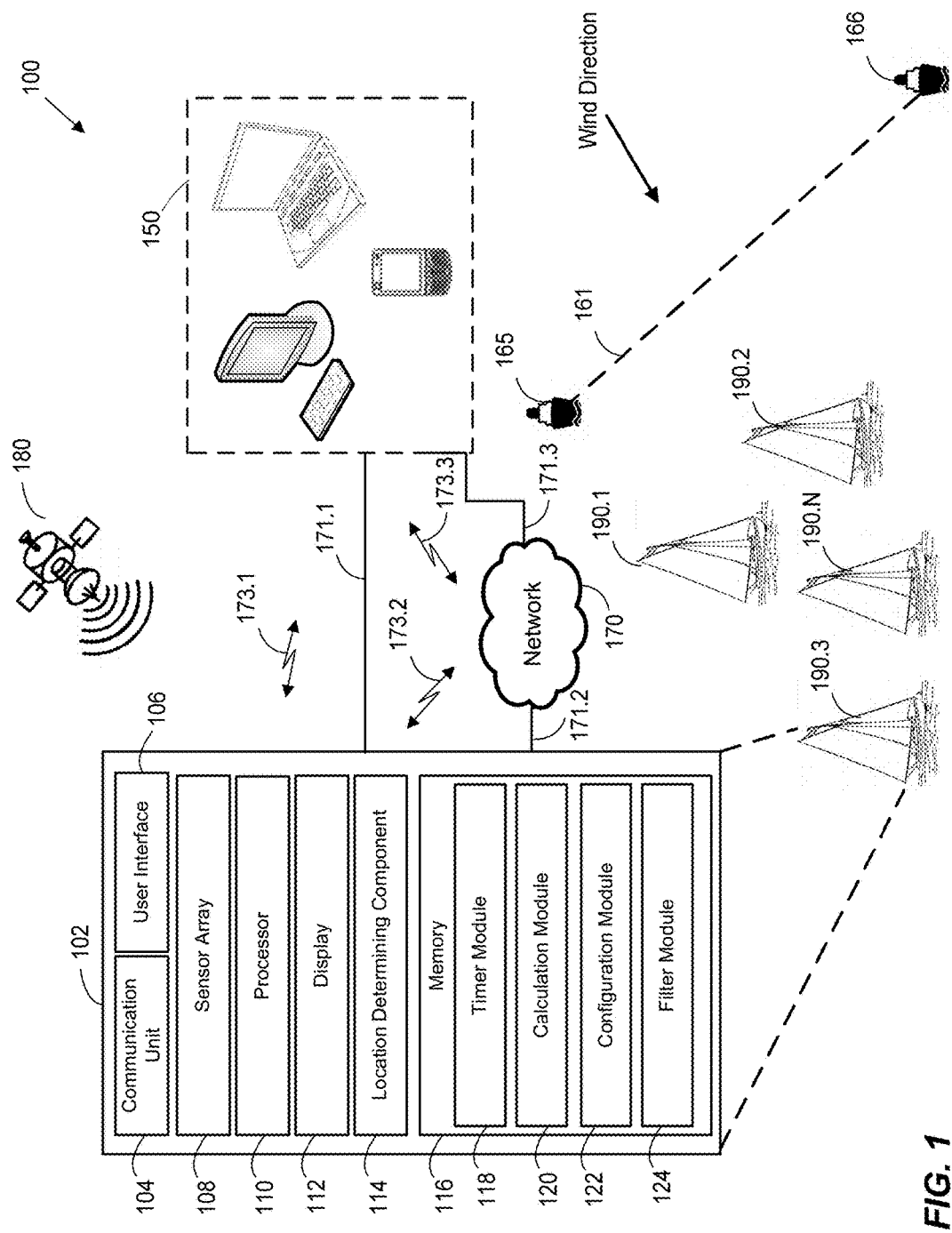
FIG. 1 is an illustration of a block diagram of an exemplary navigational system 100 in accordance with an embodiment of the present disclosure.

FIG. 1 is an illustration of a block diagram of an exemplary navigational system 100 in accordance with an embodiment of the present disclosure. Navigational system 100 may include a navigation device 102, one or more external computing devices 150, one or more communication networks 170, one or more satellites 180, a boundary line 161 marked by buoys 165 and 166, and N number of boats 190.1-190.N.

In some embodiments, navigation device 102 may act as a standalone device and not require communications with external computing devices 150. But in other embodiments, which are further discussed below, navigation device 102 may communicate with and/or work in conjunction with one or more of external computing devices 150.

Navigation device 102 and one or more external computing devices 150 may be configured to communicate with one another using any suitable number of communication networks and any suitable combination of wired and/or wireless links in conjunction with any suitable number and type of communication protocols. For example, navigation device 102 and one or more external computing devices 150 may be configured to communicate with one another directly via wired link 171.1 and/or wireless link 173.1. To provide another example, navigation device 102 and one or more external computing devices 150 may be configured to communicate with one another via network 170 utilizing wired links 171.2 and 171.3 and/or utilizing wireless links 173.2 and 173.3.

In various embodiments, one or more of external computing devices 150 may include any suitable number and/or type of computing devices configured to communicate with and/or exchange data with navigation device 102. For example, one or more of external computing devices 150 may be implemented as a mobile computing device (e.g., smartphone, tablet, laptop, phablet, netbook, notebook, pager, personal digital assistant (PDA), wearable computing device, smart glasses, a smart watch or a bracelet, etc.), or any other suitable type of computing device capable of wired and/or wireless communication (e.g., a desktop computer). To provide another example, one or more of external computing devices may include various computing devices, sensors, etc., integrated with or otherwise associated with one or more of boats 190.1-190.N.

In an embodiment, navigation device 102 may communicate with one or more of external computing devices 150 to send data to and/or to receive data from external computing devices 150. For example, navigation device 102 may communicate with one or more external computing devices 150 to receive updated cartographic data. To provide another example, navigation device 102 may communicate with one or more external computing devices 150 to receive polar data indicating sailboat speed predictions across a range of wind angles and wind speeds, which are further discussed below.

Communication network 170 may include any suitable number of nodes, additional wired and/or wireless networks, etc., in various embodiments. For example, in an embodiment, communication network 170 may be implemented with any suitable number of base stations, landline connections, internet service provider (ISP) backbone connections, satellite links, public switched telephone network (PSTN) connections, local area networks (LANs), metropolitan area networks (MANs), wide area networks (WANs), any suitable combination of local and/or external network connections, etc. To provide further examples, communication network 170 may include wired telephone and/or cable hardware, satellite, cellular phone communication networks, etc. In various embodiments, communication network 170 may provide navigation device 102 with connectivity to network services, such as Internet services, for example.

Communication network 170 may be configured to support communications between navigation device 102 and external computing devices 150 in accordance with any suitable number and/or type of wired and/or wireless communication protocols.

Examples of suitable wireless communication protocols may include personal area network (PAN) communication protocols (e.g., BLUETOOTH), Wi-Fi communication protocols, radio frequency identification (RFID) and/or a near field communication (NFC) protocols, cellular communication protocols, Internet communication protocols (e.g., Transmission Control Protocol (TCP) and Internet Protocol (IP)), etc. Examples of suitable wired communication protocols may include universal serial bus (USB) protocols, Ethernet protocols, etc.

In another embodiment, navigation device 102 need not communicate with one or more of external computing devices 150. For example, as will be further discussed below, navigation device 102 may operate as a standalone navigation device that may be preprogrammed upon manufacture and installed or otherwise mounted in a boat to perform the various functions as described herein.

Navigation device 102 may be implemented as any suitable type of portable and/or mobile device configured to provide navigational guidance. Additionally or alternatively, navigation device 102 may be implemented as any suitable type of device that is mounted in, integrated within, located in, and/or otherwise associated with a boat (e.g., boat 190.3). In various embodiments, navigation device 102 may implement some portions (or the entirety of) the embodiments described herein without implementing others.

In an embodiment, navigation device 102 may include a communication unit 104, a user interface 106, a sensor array 108, one or more processors 110, a display 112, a location determining component 114, and a memory 116. Navigation device 102 may include additional elements or fewer elements as shown in FIG. 1. For example, one or more processors 110 may include and/or perform the functions otherwise performed by location determining component 114, which may be integrated as a single processing components. To provide another example, navigation device 102 may include power sources, memory controllers, memory card slots, ports, interconnects, etc., which are not described herein for purposes of brevity.

Communication unit 104 may be configured to support any suitable number and/or type of communication protocols to facilitate communications between navigation device 102 and one or more of external computing devices 150.

Communication unit 104 may be configured to receive any suitable type of information from and/or transmit any suitable type of information via to one or more of external computing devices 150. Communication unit 104 may be implemented with any suitable combination of hardware and/or software to facilitate this functionality. For example, communication unit 104 may be implemented with any number of wired and/or wireless transceivers, ports, connectors, antennas, etc.

Communication unit 104 may be configured to facilitate communications with various external computing devices 150 using various types of communication protocols. For example, communication unit 104 may facilitate communications between navigation device 102 and a mobile computing device via a wireless BLUETOOTH communication protocol (e.g., via wireless link 173.1) and/or with a laptop or a personal computer via a wired universal serial bus (USB) protocol (e.g., via wired link 171.1). To provide another example, communication unit 104 may facilitate communications between navigation device 102 and a server via communication network 170 using a wireless cellular protocol (e.g., via wireless links 173.2 and 173.3 in conjunction with communication network 170). Communication unit 104 may be configured to support simultaneous or separate communications between two or more of external computing devices 150.

User interface 106 may be configured to facilitate user interaction with navigation device 102 and/or to provide feedback to a user. In an embodiment, a user may interact with user interface 106 to place navigation device 102 into various modes of operation, to initiate certain functions, to modify settings, set options, etc., which are further discussed below.

For example, user interface 106 may include a user-input device such as an interactive portion of display 112 (e.g., a "soft" keyboard, buttons, menu options, etc.) displayed on display 112), physical buttons integrated as part of navigation device 102 that may have dedicated and/or multipurpose functionality, etc. To provide another example, user interface 106 may cause visual notifications to be displayed via display 112 and/or audible notifications to be sounded. Audible notifications may be sounded via implementation of any suitable device, such as a buzzer, speaker, etc., which are not shown in FIG. 1 for purposes of brevity.

Sensor array 108 may be implemented as any suitable number and/or type of sensors configured to measure, monitor, and/or quantify one or more characteristics of navigation device 102's environment as sensor data metrics. For example, sensor array 108 may measure a wind direction and/or speed and generate wind data. To provide another example, sensor array 108 may measure other sensor data metrics such as a magnetic field direction and/or intensity (e.g., to determine a compass direction).

Sensor array 108 may be advantageously mounted or otherwise positioned within navigation device 102 to facilitate these functions. Sensor array 108 may be configured to sample sensor data metrics and/or to generate sensor data metrics continuously or in accordance with any suitable recurring schedule, such as, for example, on the order of several milliseconds (e.g., 10 ms, 100 ms, etc.), once per every second, once per every 5 seconds, once per every 10 seconds, once per every 30 seconds, once per minute, etc.

Examples of suitable sensor types implemented by sensor array 108 may include one or more anemometers, wind direction sensors, accelerometers, gyroscopes, perspiration detectors, compasses, speedometers, magnetometers, barometers, water depth sensors, water current speed and/or direction sensors, thermometers, proximity sensors, light sensors (e.g., light intensity detectors), photodetectors, photoresistors, photodiodes, Hall Effect sensors, electromagnetic radiation sensors (e.g., infrared and/or ultraviolet radiation sensors), ultrasonic and/or infrared range detectors, humistors, hygrometers, altimeters, biometrics sensors (e.g., heart rate monitors, blood pressure monitors, skin temperature monitors), microphones, etc.

Display 112 may be implemented as any suitable type of display configured to facilitate user interaction with navigation device 102, such as a capacitive touch screen display, a resistive touch screen display, etc. In various aspects, display 112 may be configured to work in conjunction with user-interface 106 and/or processor 110 to detect user inputs upon a user selecting a displayed interactive icon or other graphic, to identify user selections of objects displayed via display 112, etc.

Location determining component 114 may be implemented as a satellite navigation receiver that works with a global navigation satellite system (GNSS) such as the global positioning system (GPS) primarily used in the United States, the GLONASS system primarily used in the Soviet Union, the BeiDou system primarily used in China, and/or the Galileo system primarily used in Europe. The GNSS includes a plurality of satellites 180 in orbit about the Earth. The orbit of each satellite is not necessarily synchronous with the orbits of other satellites and, in fact, is likely asynchronous.

A GNSS equipped device such as navigation device 102 is shown receiving spread spectrum satellite signals from the various satellites 180. The spread spectrum signals continuously transmitted from each satellite may use a highly accurate frequency standard accomplished with an extremely accurate atomic clock. Each satellite 180, as part of its data signal transmission, may transmit a data stream indicative of that particular satellite. Navigation device 102 may acquire spread spectrum satellite signals from at least three satellites 180 for the receiver device to calculate its two-dimensional position by triangulation. Acquisition of an additional signal, resulting in signals from a total of four or more satellites 180, permits navigation device 102 to calculate its three-dimensional position.

Location determining component 114 and processor 110 may be configured to receive navigational signals from the satellites 180 and to calculate positions of navigation device 102 as a function of the signals. Location determining component 114 and processor 110 may also determine track logs or any other series of geographic location data (e.g., geographic coordinates) corresponding to points along a route or other path traveled by a user of navigation device 102 and/or a device in which navigation device 102 is mounted or otherwise positioned (e.g., boat 190.3). Location determining component 114 and/or processor 110 may also be configured to calculate routes to desired locations, provide instructions to navigate to the desired locations, display maps and other information on display 112, and/or execute other functions described herein.

Location determining component 114 may include one or more processors, controllers, or other computing devices and memory to calculate a geographic location and other geographic information without processor 110, or location determining component 114 may utilize components of processor 110. Further, location determining component 114 may be integral with processor 110 such that location determining component 114 may be operable to specifically perform the various functions described herein. Thus, the processor 110 and location determining component 114 may be combined or be separate or otherwise discrete elements.

Location determining component 114 may include an antenna to assist in receiving the satellite signals. The antenna may be a patch antenna, a linear antenna, or any other suitable type of antenna that can be used with navigational devices. The antenna may be mounted directly on or in the housing of navigation device 102, or may be mounted external to the housing of navigation device 102.

Although embodiments of navigation device 102 may include a satellite navigation receiver, it will be appreciated that other location-determining technology may be used. For example, communication unit 104 may be used to determine the location of navigation device 102 by receiving data from at least three transmitting locations and then performing basic triangulation calculations to determine the relative position of navigation device 102 with respect to the transmitting locations. For example, cellular towers or any customized transmitting radio frequency towers may be used instead of satellites 180. With such a configuration, any standard geometric triangulation algorithm may be used to determine the location of navigation device 102.

In other embodiments, location determining component 114 need not directly determine the current geographic location of navigation device 102. For instance, location determining component 114 may determine the current geographic location of navigation device 102 through a communications network, such as by using Assisted Global Positioning System (A-GPS) by receiving communications from a combination of base stations and/or satellites 180, or from another electronic device. Location determining component 114 may even receive location data directly from a user. For example, a user may obtain location data for a physical activity before and after it has been completed from another satellite navigation receiver or from another source and then manually input the data into navigation device 102.

Processor 110 may be implemented as any suitable type and/or number of processors, such as a host processor of navigation device 102, for example. To provide additional examples, processor 110 may be implemented as an application specific integrated circuit (ASIC), an embedded processor, a central processing unit associated with navigation device 102, a graphical processing unit (GPU), etc., or any combination thereof.

Processor 110 may be configured to communicate with one or more of communication unit 104, user interface 106, sensor array 108, display 112, location determining component 114, and/or memory 116 via one or more wired and/or wireless interconnections, such as any suitable number of data and/or address buses, for example. These interconnections are not shown in FIG. 1 for purposes of brevity.

Processor 110 may be configured to operate in conjunction with one or more of communication unit 104, user interface 106, sensor array 108, display 112, location determining component 114, and/or memory 116 to process and/or analyze data (which may include geographic location data and/or other sensor metrics), to store data to memory 116, to retrieve data from memory 116, to display information on display 112, to receive, process, and/or interpret sensor data metrics from sensor array 108, to process and/or store selections from user interactions via user interface 106, to determine and/or calculate the length, position, angle, color, etc., of various graphical elements that may be displayed on display 112 such as laylines, guidelines, and/or predictor lines (further discussed below), to maintain one or more timers, to calculate a time until boundary line 161 may be reached given a current speed of the boat in which navigation device 102 is mounted, to update one or more elements displayed on display 112 based upon sensor metrics generated via sensor array 108 and/or geographic location data generated via location determining component 114, to receive data from and/or send data to one or more of external computing devices 150, etc.

In accordance with various embodiments, memory 116 may be a computer-readable non-transitory storage device that may include any suitable combination of volatile (e.g., a random access memory (RAM)), or non-volatile memory (e.g., battery-backed RAM, FLASH, etc.). Memory 116 may be configured to store instructions executable on processor 110, such as the various memory modules illustrated in FIG. 1 and further discussed below, for example. These instructions may include machine readable instructions that, when executed by processor 110, cause processor 110 to perform various acts as described herein.

Memory 116 may also be configured to store any other suitable data used in conjunction with navigation device 102, such as data received from one or more of external computing devices 150 via communication unit 104, sensor data metrics, geographic location data, cartographic data, polar data indicating sailboat speed predictions across a range of wind directions and wind speeds, etc.

Timer module 118 is a region of memory 116 configured to store instructions, that when executed by processor 110, cause processor 110 to perform various acts in accordance with applicable embodiments as described herein.

In an embodiment, timer module 118 may include instructions that, when executed by processor 110, cause processor 110 to track a milestone time corresponding to when a boat in which navigation device 102 is located needs to cross boundary line 161. For example, in embodiments in which navigation device 102 is utilized in conjunction with a sailboat race, boundary line 161 may function as a starting line and the milestone time may correspond to the start time of the sailboat race. To provide another example, in embodiments in which navigation device is used in conjunction with a time-sensitive sporting event (e.g., a timed fishing competition), boundary line 161 may function as a finish line and the milestone time may correspond to the end of the time period allotted for the sporting event.

Timer module 118 may include instructions that facilitate the maintenance and/or display of the milestone time via display 112 in any suitable manner. For example, processor 110 may execute instructions stored in timer module 118 to maintain a countdown timer synchronized with and/or counting down to the milestone time. This countdown timer may be manually set and started, for example, by a user providing the appropriate inputs via user interface 106.

The countdown time may also be set automatically, for example, by taking advantage of the current time of day maintained by navigation device 102, which may be manually set by a user, obtained by communications received via location determining component 114, obtained by communications received via communications unit 104, etc. If the milestone time is known, a user may provide this information using the appropriate inputs via user interface 106. Upon receipt of the milestone time, processor 110 may execute instructions stored in timer module 118 to compare the milestone time to the time of day maintained by navigation device 102 and display a countdown timer using the difference between these two times.

To provide another example, the milestone time (or a countdown time until the milestone time) may be broadcasted as a signal that is received via navigation device 102 by communication unit 104. Embodiments include processor 110 executing instructions stored in timer module 118 to compare the received milestone time to the time of day maintained by navigation device 102 (or receiving the countdown time itself), and displaying a countdown timer using this information.

Calculation module 120 is a region of memory 116 configured to store instructions, that when executed by processor 110, cause processor 110 to perform various acts in accordance with applicable embodiments as described herein.

In an embodiment, calculation module 120 may include instructions that, when executed by processor 110, cause processor 110 to calculate various graphical elements and/or metrics displayed on display 112. For example, calculation module 120 may facilitate the calculation of a distance between navigation device 102 and boundary line 161, a velocity made good (VMG), a true wind angle, a target speed, a water speed, a starboard and/or port layline angle based upon the wind direction, a starboard and/or port layline length, a length and/or direction of a predictor line extending in front of the boat in which navigation device 102 is mounted, etc. The details of these calculations are further discussed below with reference to FIGS. 2 and 3A-3D.

Configuration module 122 is a region of memory 116 configured to store instructions, that when executed by processor 110, cause processor 110 to perform various acts in accordance with applicable embodiments as described herein.

In an embodiment, configuration module 122 may include instructions that, when executed by processor 110, cause processor 110 to store and/or calculate various metrics that may be used in conjunction with the calculations performed by processor 110 when executing instructions stored in calculation module 120. For example, configuration module 122 may store adjustments to the target speed, one or more target times, algorithms, equations, etc., in which layline lengths and angles are calculated and displayed, windward and leeward angles, an option of whether to account for the tide when the various calculations are performed as discussed herein, the input of coordinates defining boundary line 161, the storage of one or more waypoints, etc.

Filter module 124 is a region of memory 116 configured to store instructions, that when executed by processor 110, cause processor 110 to perform various acts in accordance with applicable embodiments as described herein.

In an embodiment, filter module 124 may include instructions that, when executed by processor 110, cause processor 110 to filter sampled data (e.g., sensor data metrics and/or geographic location data) to influence when and how often changes in the data affect the graphical elements and/or other metrics displayed via display 112.

For example, filter module 124 may include instructions that, when executed by processor 110, cause processor 110 to average a number of sensor metric values (e.g., wind speed measurements) over a sampling period such that various graphical elements that vary with changes in the wind direction and/or speed (e.g., the angle and length of laylines displayed on display 112) are "smoothed" when display 112 is periodically updated. In other words, processor 110 may collect data, average this data or otherwise smooth the data (e.g., by eliminating the highest and lowest values, averaging the values collected over some sampling period, etc.) and use the resulting smoothed data for the calculations used to update graphical elements and/or other metrics displayed on display 112. In an embodiment, the sampling period may be equal to or proportional to the refresh rate of display 112, such that graphical elements and/or other metrics displayed on display 112 are refreshed each time display 112 refreshes in a smooth manner.

Figure 2:
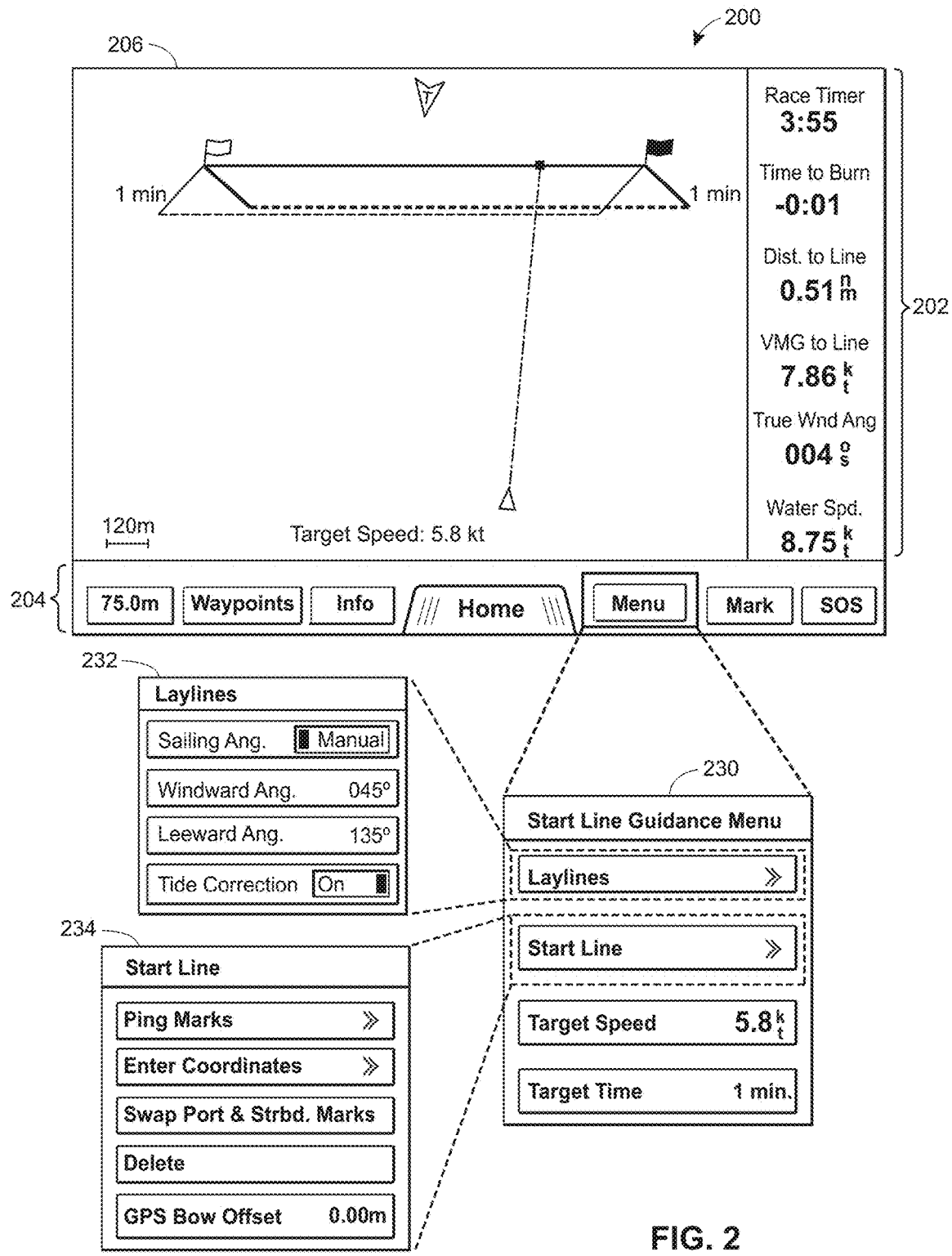
FIG. 2 is a schematic illustration example of a user interface screen 200 used to implement the configuration of a navigation device, according to an embodiment.

FIG. 2 is a schematic illustration example of a user interface screen 200 used to implement the configuration of a navigation device, according to an embodiment. In an embodiment, user interface screen may be displayed on any suitable display, such as display 112 of navigation device 102, for example, as shown in FIG. 1. User interface screen 200 (and the screens shown and discussed regarding FIGS. 3A-3D) is one example of an implementation of how various graphical elements, metrics, and/or user interactive buttons may be presented to a user. It will be understood that navigation device 102 may display the information as discussed throughout the present disclosure using any suitable techniques.

As shown in FIG. 2, user interface screen 200 may include a portion 202 that conveys information to a user, a portion 204 that provides several selectable options to facilitate user interaction with navigation device 102, and a portion 206 that displays graphical elements, data metrics, and/or other information to facilitate navigational assistance.

In various embodiments, some of the information shown in portion 202 may be related to the graphical elements displayed in user interface screen 200, while other information shown in portion 202 may provide data that is relevant for the particular application in which navigation device 102 is implemented. In the example shown in FIG. 2 (as well as FIGS. 3A-3D) navigation device 102 is implemented in accordance with a sailboat race and is assumed to be located in a boat (e.g., boat 190.3). In such a case, as shown in FIG. 2, portion 202 may include data indicative of the time until the start of a sailboat race (Race Timer), a Time to Burn (which is further discussed below), a perpendicular distance between the boat in which navigation device 102 is located (Dist. to Line), a velocity made good to the line (VMG to Line), a true wind angle (True Wnd Ang), a water speed (Water Spd.), etc. Continuing this example, the various sensor metrics used by navigation device 102 to display this information may be received via communications with various components associated with boat 190.3, one or more external computing devices 150, and/or generated via sensor array 108.

In various embodiments, portion 204 may include information and/or various interactive buttons. The information shown in portion 204 may include any suitable type of information received via communications with various components associated with boat 190.3, one or more external computing devices 150, and/or generated via sensor array 108, such those shown in portion 202, for example. As shown in FIG. 2, the water depth is shown in portion 204 as 75 meters (75.0 m). The interactive buttons, when selected by a user, may facilitate the collection of user input for the particular application in which navigation device 102 is implemented. Continuing the example of a sailboat race, portion 204 may display selectable buttons such as a waypoint button to facilitate the entry of waypoint locations (Waypoints), an information button to display any suitable information related to the operation of navigation device 102 and/or relevant information for a sailing race, such as current weather conditions, software versions, a date and/or time of day, etc. (Info), a home button that returns the navigation device 102 to a default display (Home), a menu button that opens one or more submenus for a user to enter information (Menu), a mark button for recording the current geographic location (Mark), an SOS button to facilitate navigation device 102 broadcasting an emergency alert (SOS), etc.

As shown in FIG. 2, one or more buttons displayed in portion 204 may open up additional options and/or submenus to facilitate user navigation and user input of various types of information into navigation device 102. For example, upon selecting the "Menu" button, a start line guidance menu 230 may be displayed, which may also include several buttons that, upon being selected by a user, display additional submenus. For example, as shown in FIG. 2, selection of the "Laylines" button from the start line guidance menu 230 opens laylines menu 232, while selection of the "Start Line" button opens start line submenu 234.

Again, navigation device 102 may be implemented for any suitable application in which a boat needs to cross boundary line 161 at a specific time. But regardless of the application, embodiments include navigation device 102 calculating the location and/or position of boundary line 161 in various ways. For sailboat race applications, the geographic location (e.g., the geographic coordinates) of buoys 165 and 166 may be released before the race begins. In such a case, a user may input these coordinates by selecting the "Enter Coordinates" button from start line submenu 234, as shown in FIG. 2.

To provide another example, a sailboat may "ping" the geographic location of buoys 165 and 166, which may be used, for example, when the geographic location of buoys 165 and 166 is not released or otherwise known prior to the start of the race. Continuing this example, a sailor may position the boat at each of buoys 165 and 166 and use the "Ping Marks" button in start line submenu 234 to store the current geographic location of navigation device 102 as the location of each of buoys 165 and 166.

To provide yet another example, a user may select the locations of buoys 165 and 166 from the map displayed in portion 206 by interacting with portion 206 with a suitable gesture (e.g., tapping the screen of navigation device 102 where portion 206 is displayed), using a stylus, etc. That is, a user may define the location of each of buoys 165 and 166 in a manner similar to creating a waypoint in a traditional GPS navigation system using the map data displayed on the map.

Continuing the example of a sailboat racing application, embodiments include portion 206 displaying a map including various graphical elements and/or other information useful for sailboat race navigation. More specifically, portion 206 may display graphical elements and/or information to assist a sailor navigating a sailboat across a boundary line at the proper time. The graphical elements displayed in portion 206 are further discussed below with reference to FIGS. 3A-3D.

Because the time in which the boat crosses boundary line 161 may be critical for sailboat racing and/or other competitive boating events, embodiments include the entry of an offset between the bow of the boat in which navigation device 102 is located and the location of navigation device 102 within the boat. For example, a user may measure this offset, select the "GPS Bow Offset" button from start line submenu 234, and enter the offset accordingly. In various embodiments, the calculation of distances between the boat and boundary line 161, the calculation of how long until the boat will cross boundary line 161, etc., may offset the geographic location determined via location determining component 114 with this offset value, and perform the calculations described herein using the offset geographic location as the geographic location of the bow of boat in which navigation device 102 is located.

Figure 3A:
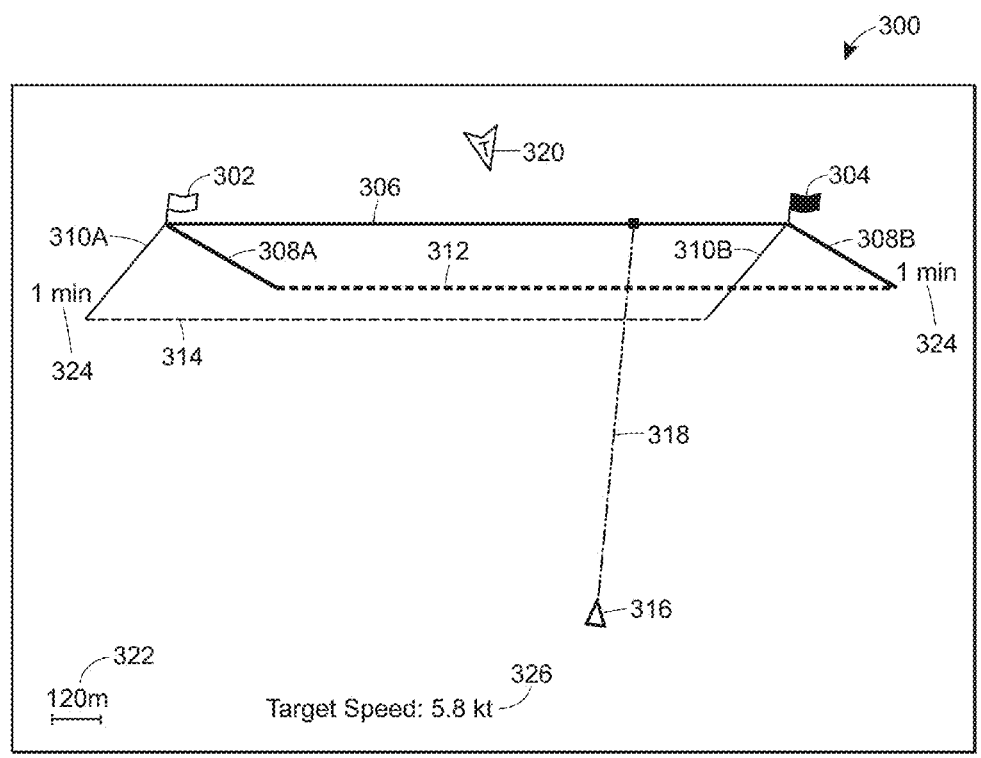
FIGS. 3A-3B are schematic illustration examples of navigational screens 300 used to implement navigational guidance and show changing laylines and guidelines, according to an embodiment.
Figure 3B:
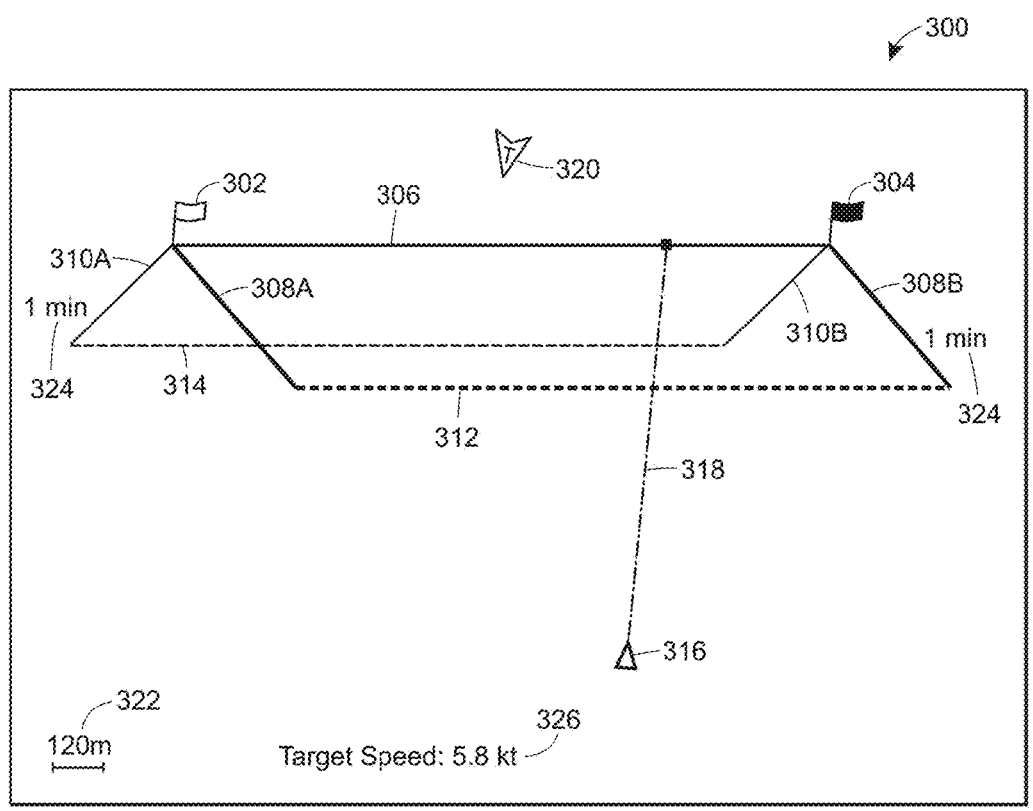

FIGS. 3A-3B are schematic illustration examples of navigational screens 300 used to implement navigational guidance and show changing laylines and guidelines, according to an embodiment. In an embodiment, navigational screens 300 may be displayed on any suitable display, such as display 112 of navigation device 102, for example, as shown in FIG. 1. In an embodiment, navigational screens 300 may represent different exemplary views of portion 206, as shown and previously discussed with reference to FIG. 2.

As shown in FIG. 3A, navigational screen 300 may display graphical elements such as a port marker 302, a starboard marker 304, a boundary line 306, starboard laylines 308A and 308B, port laylines 310A and 310B, a starboard guideline 312, a port guideline 314, a boat indicator 316, a predictor line 318, a true wind indicator 320, and a scale 322. Navigational screen 300 may additionally display data calculated from sensor metrics and/or input by a user, which may influence how the various graphical elements are displayed. For example, as shown in FIG. 3A, navigational screen 300 may display a target time indicator 324 and a target speed indicator 326.

Furthermore, the information shown in navigational screen 300 may be calculated via execution of instructions stored in calculation module 120 by processor 110. In an embodiment, any suitable number and/or type of information may be displayed in navigational screen 300, which may be calculated using any suitable techniques. For example, the target speed indicator 326 may display a target speed that is manually input by a user via selection of the "Target Speed" button from start line submenu 234, as previously discussed with reference to FIG. 2. To provide another example, the target time indicator 324 may display a target time that is manually input by a user via selection of the "Target Time" button from start line submenu 234, as previously discussed with reference to FIG. 2.

The various graphical elements displayed in navigational screen 300 may assist a sailor in navigating a sailboat in a sailboat race. For example, port marker 302 and starboard marker 304 may indicate the direction of markings defining boundary line 306. Using FIG. 1 as an example, port marker 302 and starboard marker 304 may correspond to the locations of buoys 165 and 166, respectively, while boundary line 306 may correspond to the location of boundary line 161.

Furthermore, starboard laylines 308A-B and port laylines 310A-310B may be displayed extending from each of port marker 302 and starboard marker 304 in a direction representing an optimum tacking angle that, when traversed by the sailboat at that angle at the target speed, yields the fastest route between the sailboat and boundary line 306. For example, as shown in FIG. 3A, starboard laylines 308A and 308B are parallel to one another. Starboard layline 308A extends from port marker 302, while starboard layline 308B extends form the starboard marker 304. A sailboat following a tacking course parallel with starboard laylines 308A-B will thus reach boundary line 306 in the fastest amount of time. Similarly, as shown in FIG. 3A, port laylines 310A and 310B are parallel to one another. Port layline 310A extends from port marker 302, while port layline 310B extends form the starboard marker 304. A sailboat following a tacking course parallel with port laylines 310A-B will thus reach boundary line 306 in the fastest amount of time.

To provide navigational guidance for sailors, embodiments include navigational screen 300 including a graphical representation of the distance traversed by a sailboat at the target speed at the tacking angle represented by the angle of the starboard laylines 308A-B when tacking to the starboard side, as well as the distance traversed by a sailboat at the target speed at the tacking angle represented by the angle of the port laylines 310A-B when tacking to the port side.

For example, as shown in FIG. 3A, navigational screen 300 displays a target time of 1 minute, which may be set by a user (e.g., via the "Target Time" button from start line submenu 234, as previously discussed with reference to FIG. 2), represent a default target time, etc. The length of starboard laylines 308A or 308B, therefore, may represent a distance travelled by the sailboat when sailing in the direction indicated by the angle of starboard laylines 308A-B for a time period equal to the target time. To provide a graphical indication of this distance to boundary line 306, embodiments include navigational screen 300 including a starboard guideline 312 connecting each end of starboard laylines 308A-B.

Similarly, the length of port laylines 310A and 310B may represent a distance travelled by the sailboat when sailing in the direction indicated by the angle of port laylines 308A-B for a time period equal to the target time. To provide a graphical indication of this distance to boundary line 306, embodiments include navigational screen 300 including a port guideline 314 connecting each end of port laylines 310A-B.

Regarding the target speed, as is known to those familiar with the sport of sailing, a sailboat's target speed may be defined as a theoretically perfect number where the forward speed of the boat and the true-wind angle are optimized either into or away from the wind. Therefore, a sailboat's target speed is a function of the true wind speed and direction. When wind conditions are somewhat stable, a user may enter the target speed for a given true wind angle and velocity using a manufacturer supplied polar chart, for example. To provide another example, a sailor may make a "dry run" toward boundary line 306 at one or more angles to determine a preferred target speed given current conditions, etc. But when the true wind angle and/or velocity is rapidly changing, it may be cumbersome to repeat these calculations.

Therefore, embodiments include navigation device 102 calculating the target speed based upon the true wind direction and velocity. The true wind direction and/or velocity may be determined in various ways by navigation device 102. For example, the true wind angle and/or velocity may be calculated via one or more wind data sensor metrics measured, generated, and/or received at navigation device 102 (e.g., via sensor array 108). To provide another example, the true wind angle and/or velocity may be received as communications via communication unit 104. To provide another example, the boat in which navigation device 102 is located may determine the true wind angle and/or velocity via sensors integrated and/or associated with the boat, which may be communicated to navigation device 102 via communication unit 104.

Once navigation device 102 obtains the true wind angle and/or velocity, embodiments include using this data for the calculation of target speed, displaying this data as a numerical value (e.g., in portion 202 as discussed with reference to FIG. 2), displaying this data as a graphical element within navigation screen 300, as shown in FIGS. 3A-3B by true wind indicator 320, etc. For example, the direction of true wind indicator 320 in navigation screen 300 indicates the direction of the true wind, while the true wind angle in portion 202, as shown in FIG. 2, indicates this as a number (004°s).

To calculate the target speed using the true wind direction and velocity, embodiments include navigation device 102 receiving, downloading, and/or storing polar chart data (e.g., in memory 116). Processor 110 may access this data to correlate the current true wind direction and velocity to calculate the target speed. The target speed may be calculated via processor 110 over time at any suitable sampling rate, and the calculated target speeds may be filtered or smoothed over time (e.g., via execution of instructions stored in filter module 124) such that navigation screen 300 updates the target speed, true wind speed, and/or true wind direction in a manner that is easily viewed by a user.

In various embodiments, the angles of starboard laylines 308A-B and port laylines 310A-B may be calculated in any suitable manner. As will be understood by those familiar with sailing, the layline angles represented by starboard laylines 308A or 308B and port laylines 310A and 310B are a function of the true wind direction, as the optimum tacking angle will change accordingly. In some embodiments, a user may manually specify these angles, for example, by selecting the manual "Sailing Angle" option from laylines submenu 232, as shown in FIG. 2, and specifying the windward and leeward angles accordingly.

In other embodiments, a user may manually specify these angles, for example, by setting the "Sailing Angle" option button from laylines submenu 232 to a "current" position, which would result in the windward and leeward angles being set using the current direction that the boat in which navigation device 102 is located is currently traveling. The current position of the sailing angle option button is not shown in FIG. 2 for purposes of brevity, but may include, for example, a position on a multi-setting switch as indicated by the slider bar in laylines submenu 232. This option may be particularly useful, for example, when a sailor has an idea of a preferred angle and positions the boat to travel in that direction before the race begins.

In still other embodiments, navigation device 102 may automatically calculate these angles, for example, by setting the "Sailing Angle" option toggle from laylines submenu 232 to an "Automatic" position, which would result in the windward and leeward angles being calculated using the true wind direction and velocity by correlating this data to polar chart data for the particular sailboat in which navigation device 102 is used. The automatic position of the "Sailing Angle" option toggle is not shown in FIG. 2 for purposes of brevity, but may include, for example, a position on a multi-setting switch as indicated by the slider bar in laylines submenu 232. This option may be particularly useful, for example, when the wind direction is changing rapidly and/or the sailor does not want to perform manual calculations of the layline angles.

In accordance with automatically updating layline embodiments, as the true wind direction changes from 0 degrees to more of a starboard or port direction, the starboard laylines 308A-B and port laylines 310A-B may also change direction. Because the target speed also changes based upon changes in the true wind speed and direction, the length traversed by the sailboat traveling in the starboard or port layline angle may also change. As a result of this change, embodiments may include navigation device 102 recalculating and updating the length of the starboard laylines 308A-B and port laylines 310A-B over time (e.g., in accordance with a suitable sampling rate, as previously discussed) with changes in the true wind angle.

As shown in FIG. 3B, navigation screen 300 includes the same graphical elements as those shown in FIG. 3A. However, the true wind direction shown in navigation screen 300 of FIG. 3A is different than the true wind direction as shown in FIG. 3B, which is indicated by the change in direction of true wind indicator 320 between FIG. 3A and FIG. 3B. If included in FIGS. 3A-3B, the numerical indicator of the true wind direction (e.g., as shown in portion 202 of FIG. 2) would likewise update to indicate this change.

Due to the change in the direction of the true wind angle between FIGS. 3A and 3B, (and potentially the velocity as well), the angle and length of starboard laylines 308A-B and port laylines 310A-B have changed such that starboard guideline 312 is further from boundary line 306 in FIG. 3B than in FIG. 3A and port guideline 314 is closer to boundary line 306 in FIG. 3B than in FIG. 3A. In this way, embodiments include navigation device 102 updating the angles and lengths of various graphical elements displayed in navigation screen 300 with changes in the direction and velocity of the true wind over time.

Because a great number of sailboats may be near the starting line before race time (e.g., 100 or more), embodiments may advantageously allow for a sailor to quickly ascertain several angles for approaching the starting line as the race is about to start and to easily view the resulting times in which the boat will cross boundary line 306 when approaching at the present angle and speed.

Figure 3C:
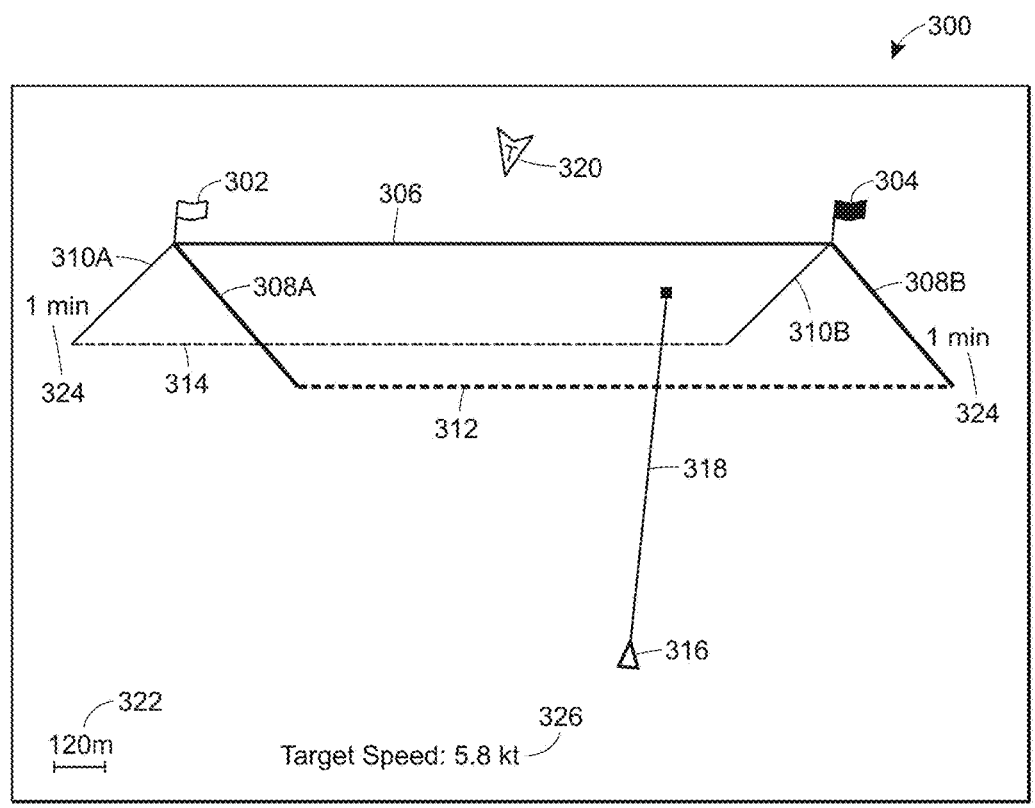
FIGS. 3C-3E are schematic illustration examples of a navigational screens 300 used to implement navigational guidance and show a changing predictor line, according to an embodiment.
Figure 3D:
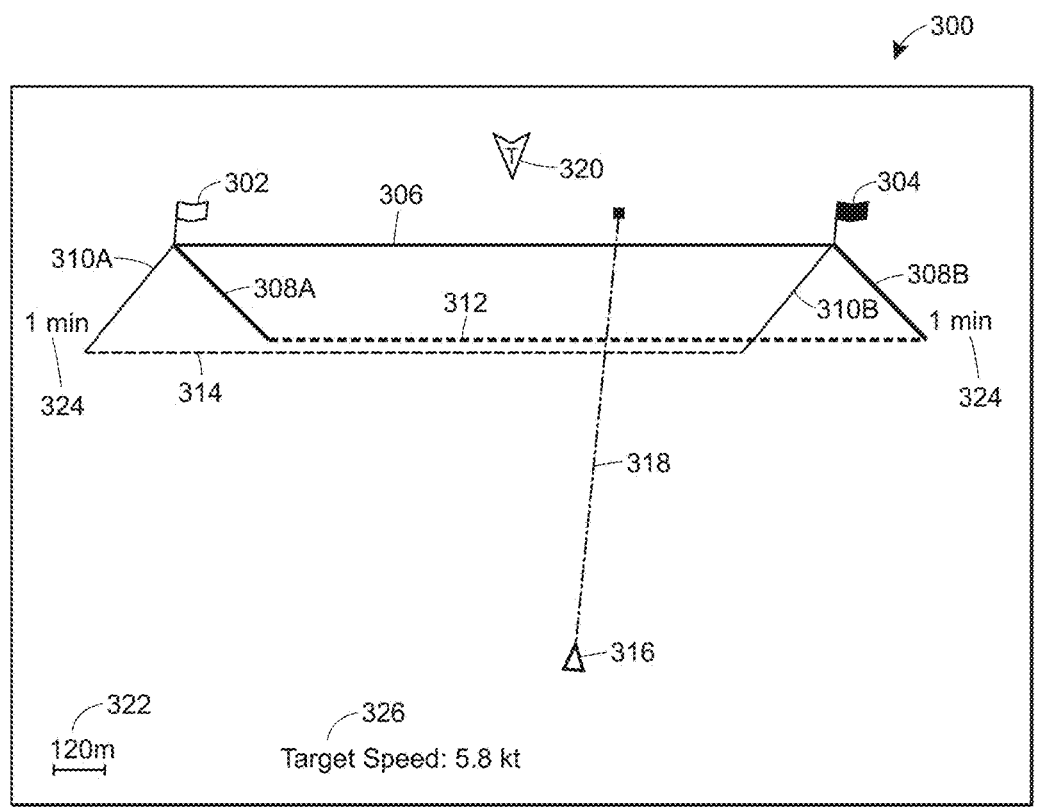

FIGS. 3C-3D are schematic illustration examples of navigational screens 300 used to implement navigational guidance and show a changing predictor line, according to an embodiment. In an embodiment, navigational screens 300 may be displayed on any suitable display, such as display 112 of navigation device 102, for example, as shown in FIG. 1. In an embodiment, navigational screens 300 may represent different exemplary views of portion 206, as shown and previously discussed with reference to FIG. 2.

As shown in FIG. 3C, navigational screen 300 may display various graphical elements and/or other information relevant to the particular application for which navigation device 102 is used. Again, with regards to sailboat racing, changes in the true wind direction and speed impact the angle and length of starboard laylines 308A and 308B, port laylines 310A and 310B, starboard guideline 312, and port guideline 314, such as a those displayed in FIGS. 3A and 3B, as discussed above.

In addition, as will be appreciated by those familiar with the sport of sailing, the changes in the true wind direction and speed may also impact how fast the sailboat may travel in its present direction with respect to the true wind angle. As shown in FIG. 3C, predictor line 318 extends in a direction from boat indicator 316 towards boundary line 306. The angle of predictor line 318 indicates the current direction the sailboat is traveling, while the length of predictor line 318 represents a predicted distance to be traversed by the sailboat traveling at its current speed for a time period equivalent to the remainder of time until the sailboat race begins. Again, because navigation device 102 may be used for other applications besides sailboat racing, the length of predictor line 318 may represent a predicted distance to be traversed by the sailboat traveling at its current speed for a time period equivalent to the remaining countdown to any suitable milestone event, such as the expiration of a timer synchronized with the time in which the boat has to cross boundary line 306, for example.

In various embodiments, the current direction and speed of the boat in which navigation device 102 is mounted may be calculated in any suitable manner by navigation device 102 alone and/or in combination with one or more external computing devices 150, in combination with one or more sensors integrated as part of the boat in which navigation device 102 is mounted, etc.

For example, sensor array 108 may generate compass data using a magnetometer device, which may be used by processor 110 executing instructions stored in calculation module 120 to calculate the current direction that the boat in which navigation device 102 is located is facing.

To provide another example, processor 110 may utilize the geographic location data generated by location determining component 114 to determine a direction and/or speed of the boat in which navigation device 102 is located. To provide an illustrative example, location determining component 114 may generate geographic location data in accordance with any suitable sampling schedule (e.g., every second, every 5 seconds, etc.), which may indicate the geographic location of navigation device 102 over several points in time. Using the difference between the sampling time periods and the change in the location of navigation device 102 over two or more consecutive sampling time periods, processor 110 may calculate the speed and direction of the boat in which navigation device 102 is located.

In this way, the calculated speed is a speed over ground, while the calculated direction may represent a course over ground. The calculated speed over ground and course over ground may be used to calculate, for the boat's present speed, the predicted distance that the boat in which navigation device 102 is mounted may traverse for a given time period, such as the expiration of the race timer, for example, as shown in FIG. 2.

In an embodiment, the calculated predicted distance to be traversed may be displayed as the length of predictor line 318, as shown in FIG. 3C. Because the calculated length of predictor line 318 is a function of the boat's current speed and the remaining time until the milestone event, this line may be updated as this speed changes and/or as time elapses. Therefore, embodiments include the direction and length of predictor line 318 dynamically updating as the sailboat's speed changes over time, providing feedback to a user regarding the predicted position of the boat at the time when the milestone event is going to occur.

For example, the length of predictor line 318, as shown in FIG. 3C, falls short of boundary line 306, indicating that at the boat's present speed the boat will cross boundary line 306 after the occurrence of the milestone event. However, the length of predictor line 318, as shown in FIG. 3D, extends beyond boundary line 306, indicating that the boat will cross boundary line 306 before the occurrence of the milestone event. In an embodiment, navigation device 102 may calculate the difference between the time required for the boat to traverse the distance represented by the length of predictor line 318 and the remaining time until the occurrence of the milestone event (e.g., via execution of instructions stored in calculation module 120 by processor 110). Navigation device 102 may display this time difference via display 112, for example, as the "Time to Burn" shown in portion 202 of FIG. 2.

For example, for the instance shown in FIG. 3C, the time to burn number may be negative, indicating to the sailor that the boat's speed should be increased to arrive at boundary line 306 faster than it would by continuing at its present speed. However, using the instance shown in FIG. 3D, the time to burn number may be positive, indicating to the sailor that the boat's speed should be decreased to arrive at boundary line 306 slower than it would by continuing at its present speed.

Furthermore, navigation device 102 may update predictor line 318 in various ways based upon the length of predictor line 318 and/or whether the boat is predicted to cross boundary line 306 before or after the occurrence of a milestone event. In various embodiments, navigation device 102 may display predictor line 318 in various colors, weights, line types, etc., based upon these conditions. Additionally or alternatively, the endpoint(s) of the predictor line 318 may be displayed, updated, and/or modified to indicate predictive information, which is further discussed below with reference to FIG. 3E. For example, the navigation device 102 could display an endpoint as a line parallel to boundary line 306. In such configurations, the predictor line 318 may be absent while the endpoint is displayed.

For example, when used in a sailing race, it is desirable for the sailboat to cross the boundary line precisely when the race timer expires, but doing so before this time results in a time penalty. Because of this penalty, it is less desirable for a sailboat to cross the starting line early than slightly late. Therefore, embodiments include predictor line 318 having a first color corresponding to the scenario illustrated in FIG. 3C, when the boat would cross boundary line after the race time expires (or at the same time), and a second, different color corresponding to the scenario illustrated in FIG. 3D, when the boat would cross boundary line before the race time expires.

Although the previous examples illustrate predictor line 318 having two different colors, embodiments include navigation device 102 displaying predictor line 318 in any suitable number of various colors, weights, line types, etc., based upon these conditions. For example, navigation device 102 may display predictor line 318 having different colors, line weights, line types, etc., for various degrees of time to burn calculations. In other words, as the length of predictor line 318 passes various threshold lengths, its color, line type, line weight, etc., may be updated as each threshold is exceeded.

As shown in the example figures, navigation device 102 may provide visual feedback that allows a sailor to quickly assess the impact of changes in the true wind direction and speed and changes in the sailboat's current speed and direction on when the sailboat is predicted to cross boundary line 306.

Figure 3E:
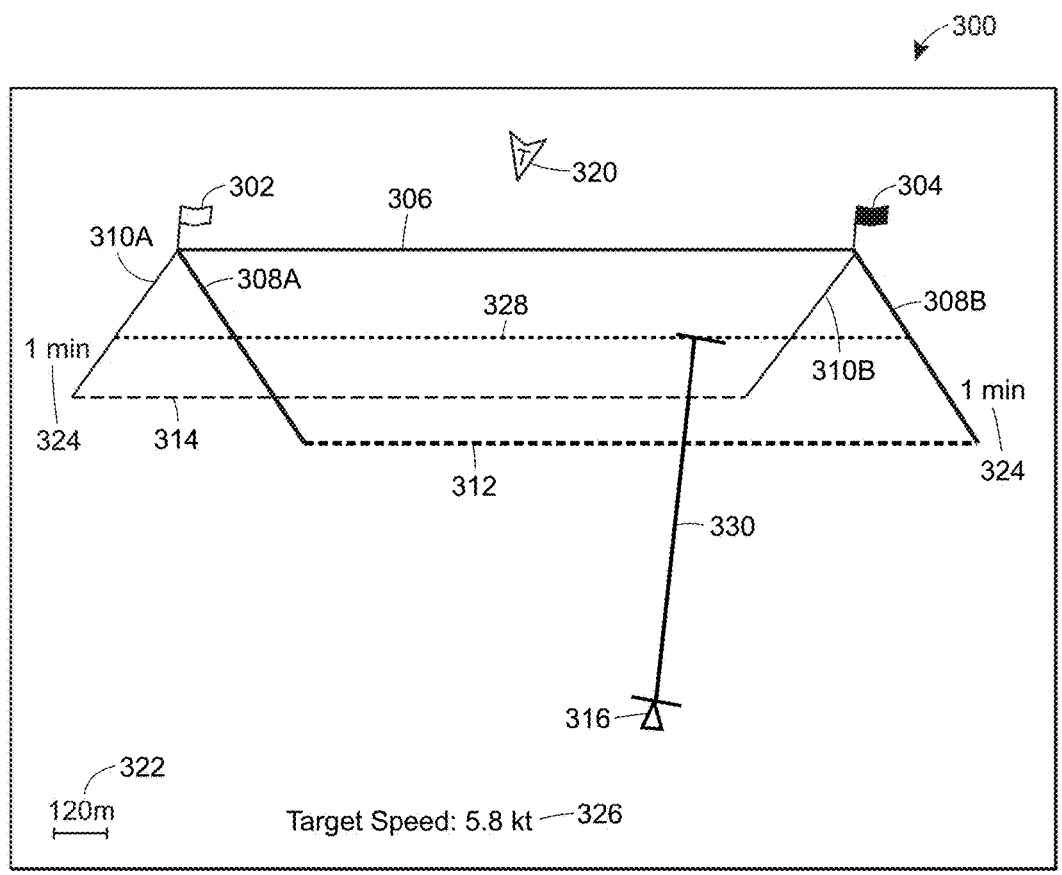

FIG. 3E is a schematic illustration example of a navigational screen 300 used to implement navigational guidance and show a changing predictor line, according to an embodiment. In an embodiment, navigational screen 300 may be displayed on any suitable display, such as display 112 of navigation device 102, for example, as shown in FIG. 1. In an embodiment, navigational screen 300 may represent different exemplary views of portion 206, as shown and previously discussed with reference to FIG. 2.

Navigational screen 300, as shown in FIG. 3E, includes several of the same graphical elements as FIGS. 3A-3D. However, navigational screen 300, as shown in FIG. 3E, also includes an estimated distance line 328 and a predicted distance 330.

In an embodiment, estimated distance line 328 is a visible line that extends parallel to boundary line 306, starboard guideline 312, and port guideline 314, which may have any line weight, color, line style, shading, etc. Estimated distance 328 may be displayed at a location offset from boundary line 306 to indicate an estimated distance between boundary line 306 and a line indicating where the boat is predicted to be if continuing to travel at its current direction and speed for a time period equivalent to the remainder of time until an event (e.g., a sailboat race) begins. In this way, estimated distance line 328 provides a user with visible feedback via navigational screen 300 regarding how close the boat will be to boundary line 306 when the event starts.

As shown in FIG. 3E, predicted distance 330 may be a visible line, in which case the length of predicted distance 330 may be displayed in an equivalent manner as that of predictor line 318, as shown and discussed with reference to FIGS. 3A-3D. But in other embodiments, predicted distance 330 may not represented as a visible line, but represent a length between the boat and estimated distance line 328 that is indicative of a predicted distance travelled by the boat if continuing to travel at its current direction and speed for a time period equivalent to the remainder of time until the event starts. Thus, as shown in FIG. 3E, predicted distance 330 has a length extending from boat indicator 316 and terminating at estimated distance line 328. Embodiments in which predicted distance 330 is not displayed as a visible line may be particularly useful, for example, when a less cluttered graphical display of navigational screen 300 is desired.

Figure 4:
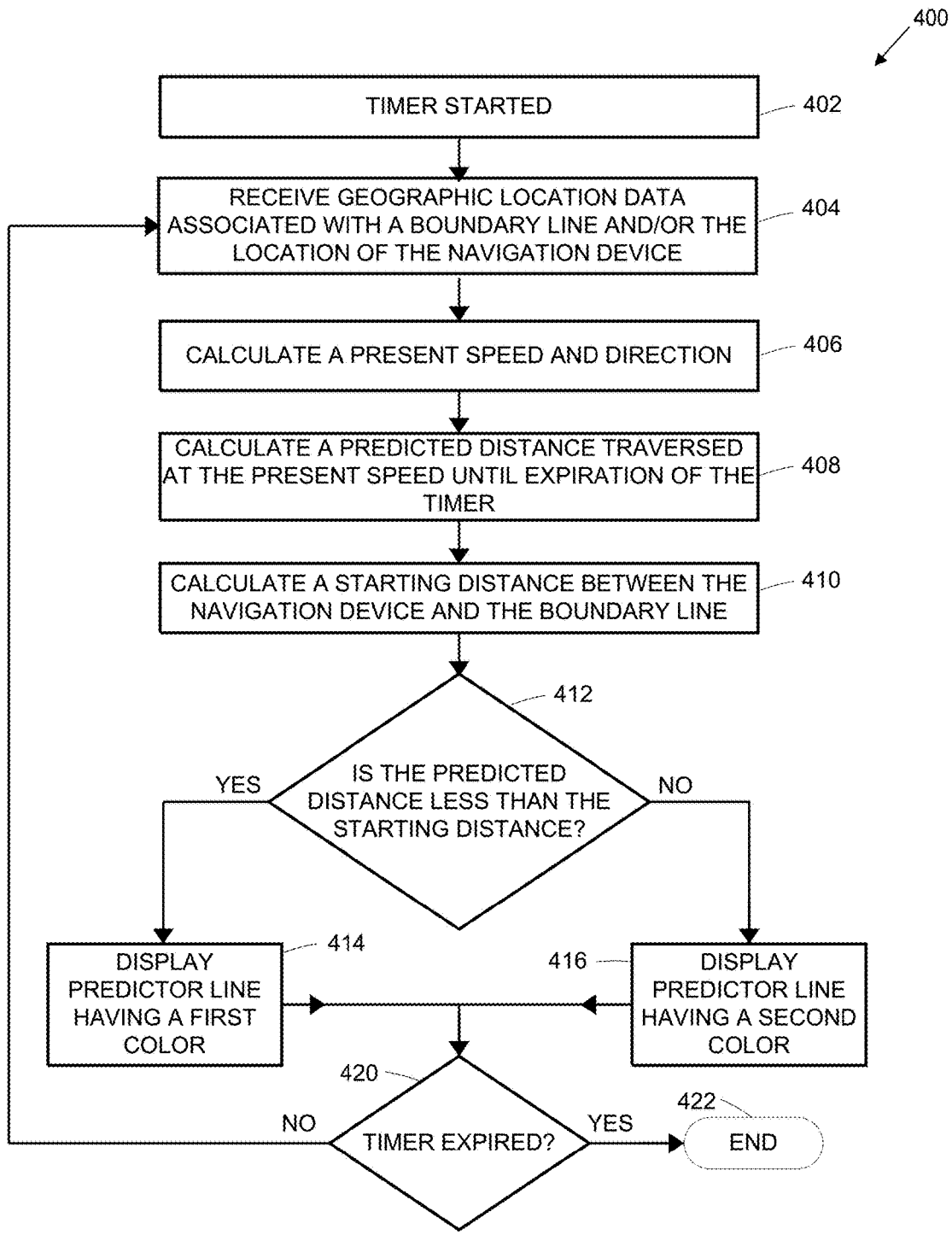
FIG. 4 illustrates a method flow 400, according to an embodiment.

FIG. 4 illustrates a method flow 400, according to an embodiment. In an embodiment, one or more regions of method 400 (or the entire method 400) may be implemented by any suitable device. For example, one or more regions of method 400 may be performed by navigation device 102, as shown in FIG. 1.

Method 400 may start when one or more processors start, initiate, and/or reference a timer (block 402). This timer may include, for example, a race timer or other timer that counts down to a milestone event, such as a sailboat race start time, for example. In various embodiments, the timer may be started by a user or automatically started based upon the passage of time, the receipt of a signal transmission, etc. (block 402).

Method 400 may include one or more processors receiving geographic location data associated with a boundary line and/or the location of the navigation device (block 404). This boundary line may be associated with a sporting event, a sailboat race, etc. In an embodiment, the timer (block 402) may countdown to a time indicating when a boat needs to cross the boundary line, which is represented by the geographic location data (block 404). The geographic location data may be received via user interaction with the navigation device in which method 400 is implemented, such as via a boundary line pinging operation, for example, as previously discussed with reference to FIG. 2 (block 404).

The geographic location data may additionally or alternatively be received via coordinates broadcasted in advance of the start of the event in which the boundary line is associated, generated via one or more components that may be integrated as part of the navigation device implementing method 400 (e.g., location determining component 114), received via communications with one or more external computing devices (e.g., boat navigation systems), etc. (block 404).

Method 400 may include one or more processors calculating the speed and direction of the device in which method 400 is implemented (block 406). This device may include, for example, a navigation device located in a sailboat (block 406). The speed and direction of the sailboat, therefore, may be calculated in various embodiments using sensor data received via the navigation device (e.g., via sensory array 108), from a change in geographic location data (block 404) over two or more sampling intervals received via a location determining component (e.g., location determining component 114), etc., as previously discussed with reference to FIG. 2 (block 406).

Method 400 may include one or more processors calculating a predicted distance traversed by the boat at the calculated speed (and/or direction, heading, bearing, or other movement parameters) (block 406) until expiration of the timer (block 408). For example, one or more processors may use the calculated present speed and direction of the boat (block 406) to solve for the distance traversed by the boat until the timer expires (block 408).

Method 400 may include one or more processors calculating a starting distance between the navigation device implementing method 400 and the boundary line (block 410). For example, one or more processors may use the present location of the boat using the geographic location data (block 404) to solve for the distance between the boat and the boundary line in the direction in which the boat is traveling (block 410).

Method 400 may include one or more processors determining whether the predicted distance (block 408) is less than the starting distance (block 412). If so, then the boat is predicted to cross the boundary line after expiration of the timer. If not, then the boat is predicted to cross the boundary line before expiration of the timer.

If the boat is predicted to cross the boundary line after expiration of the timer (or at the same time) (block 402) then method 400 may continue such that one or more processors display a predictor line having a first color (block 414). But if the boat is predicted to cross the boundary line before expiration of the timer (block 402) then method 400 may continue such that one or more processors display a predictor line having a second color (block 416), which may be different than the first color (block 414). The predictor line may include, for example, a line that is displayed extending from a graphical representation of the geographic location of the boat in a direction indicating the direction in which the boat is currently traveling, and may have a length associated with the distance traversed by the boat at the current speed until expiration of the timer (block 402), as discussed with reference to FIGS. 3C and 3D (blocks 414 and 416).

In various embodiments, method 400 may include one or more processors determining whether the timer (block 402) has expired (block 420). This may include, for example, a determination that the countdown timer (block 402) has reached zero, a determination that a preset time (e.g., a race start time) has elapsed, etc. (block 420).

If the timer has not expired, embodiments may include one or more processors repeating the steps of receiving geographic data (block 404), calculating a present speed and location of the navigation device (block 406), calculating the predicted distance (block 408), calculating the starting distance (block 410), calculating the difference between the predicted distance and the starting distance (block 412), and displaying the predictor line having a first color (block 414) or a second color (block 416), until the timer does expire (block 422). In this way, method 400 may include updating the angle, length, and/or color of the predictor line to continuously indicate, while the timer is counting down, whether the boat will cross the boundary line before or after expiration of the timer.

When the timer expires, method 400 may end upon one or more processors displaying an alternate screen, a home screen, restarting as a new timer is set, etc. (block 422).

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, numerous alternative embodiments may be implemented, using either current technology or technology developed after the filing date of this patent application.

Having thus described various embodiments of the technology, what is claimed as new and desired to be protected by Letters Patent includes the following:

1. A navigation device, comprising:
   a location determining component configured to generate geographic location data indicative of a geographic location of the navigation device and a boundary line formed over a body of water;
   a processor configured to:
      calculate a present speed and direction of the navigation device based upon changes in the geographic location data over time;
      start a countdown timer having an expiration time indicating when a boat in which the navigation device is mounted needs to cross the boundary line; and
   a display configured to:
      display a graphical representation of the geographic location of the navigation device, the boundary line, and a predictor line extending from the geographic location of the navigation device in the direction in which the boat is traveling,
   wherein the predictor line has a length representing a predicted distance to be traversed by the boat when traveling at the calculated present speed for a time period equal to the expiration time of the countdown timer.

2. The navigation device of claim 1, wherein the display is further configured to display the predictor line having a first color when the predicted distance is less than or equal to the distance between the navigation device and the boundary line, and to display the predictor line having a second color when the predicted distance is greater than the distance between the navigation device and the boundary line.

3. The navigation device of claim 1, wherein the display is further configured to update the graphical representation of the predictor line as the calculated present speed of the navigation device changes over time.

4. The navigation device of claim 1, further comprising:
   a sensor configured to measure wind direction and to generate wind data,
   wherein the processor is further configured to calculate a port layline angle and a starboard layline angle based upon the wind data, and
   wherein the display is further configured to display a port layline at the calculated port layline angle extending from each end of the boundary line and a starboard layline at the calculated starboard layline angle extending from each end of the boundary line.

5. The navigation device of claim 4, wherein the processor is further configured to:
   calculate a length of the port layline from each respective end of the boundary line based upon a distance traversed by the boat tacking at the port layline angle for a selected target time period at a target boat speed, and
   calculate a length of the starboard layline from each respective end of the boundary line based upon a distance traversed by the boat tacking at the starboard layline angle for the selected target time period at a target boat speed.

6. The navigation device of claim 5, wherein the display is further configured to display a port guideline connecting the end of each port layline extending from each end of the boundary line, and to display a starboard guideline connecting the end of each starboard layline extending from each end of the boundary line.

7. The navigation device of claim 6, wherein the display is further configured to update the length of each port layline, the angle of each port layline, the length of each starboard layline, the angle of each starboard layline, the port guideline, and the starboard guideline as the wind data indicates changes in the wind direction.

8. The navigation device of claim 1, wherein the processor is further configured to calculate a predicted boundary arrival time in which the boat will cross the boundary line based upon the boundary distance and the calculated present speed of the navigation device, and
wherein the display is further configured to display a difference between the predicted boundary arrival time and the time period equal to the expiration time of the countdown timer.

9. A navigation device located within a sailboat, comprising:
a location determining component configured to generate geographic location data indicative of a geographic location of the sailboat and a starting line of a sailboat race;
a processor configured to:
calculate a present speed and direction of the sailboat based upon changes in the geographic location data over time;
start a countdown timer having an expiration time indicating when the sailboat needs to cross the starting line for purposes of the sailboat race, and
a display configured to:
display a graphical representation of the geographic location of the sailboat, the starting line, and a predictor line extending from the geographic location of the sailboat in the direction in which the sailboat is traveling,
wherein the predictor line has a length representing a predicted distance traversed by the sailboat when traveling at the calculated present speed for a time period equal to the expiration time of the countdown timer, and
wherein the display is further configured to update the displayed predictor line based upon changes in the calculated present speed of the sailboat such that the displayed predictor line has a first color when the predicted distance is less than or equal to the distance between the sailboat and the starting line, and has a second color when the predicted distance is greater than the distance between the sailboat and the starting line.

10. The navigation device of claim 9, further comprising:
a user interface configured to receive a user selection indicating an offset distance between a mounted location of the navigation device within the sailboat and the sailboat bow, and
wherein the location determining component is further configured to utilize the offset distance to generate the geographic location data such that the geographic location of the sailboat is referenced to the sailboat bow.

11. The navigation device of claim 9, wherein the display is further configured to update the graphical representation of the predictor line as the calculated present speed of the sailboat changes over time.

12. The navigation device of claim 9, further comprising:
a sensor configured to measure wind direction and to generate wind data,
wherein the processor is further configured to calculate a port layline angle and a starboard layline angle based upon the wind data, and
wherein the display is further configured to display a port layline at the calculated port layline angle extending from each end of the starting line and a starboard layline at the calculated starboard layline angle extending from each end of the starting line.

13. The navigation device of claim 12, wherein the processor is further configured to:
calculate a length of the port layline from each respective end of the starting line based upon a predicted distance to be traversed by the sailboat tacking at the port layline angle for a selected target time period at a target sailboat speed, and
calculate a length of the starboard layline from each respective end of the starting line based upon a predicted distance to be traversed by the sailboat tacking at the starboard layline angle for the selected target time period at a target sailboat speed.

14. The navigation device of claim 13, wherein the display is further configured to display a port guideline connecting the end of each port layline extending from each end of the starting line, and to display a starboard guideline connecting the end of each starboard layline extending from each end of the starting line.

15. The navigation device of claim 14, wherein the display is further configured to
update the length of each port layline, the angle of each port layline, the length of each starboard layline, the angle of each starboard layline, the port guideline, and the starboard guideline as the wind data indicates changes in the wind direction.

16. The navigation device of claim 9, wherein the processor is further configured to calculate a predicted starting line arrival time in which the sailboat will cross the starting line based upon the present speed of the sailboat, and
wherein the display is further configured to display a difference between the starting line arrival time and the time period equal to the expiration time of the countdown timer.

17. A computer-implemented method in a mobile computing device, comprising:
receiving, by one or more processors, geographic location data indicative of a geographic location of a sailboat and a starting line of a sailboat race;
calculating, by one or more processors, a present speed and direction of the sailboat based upon changes in the geographic location data over time;
starting, by one or more processors, a countdown timer having an expiration time indicating when the sailboat needs to cross the starting line for purposes of the sailboat race; and
displaying, by one or more processors, a graphical representation of the geographic location of the sailboat, the starting line, and a predictor line extending from the geographic location of the sailboat in the direction in which the sailboat is traveling,
wherein the predictor line has a length representing a predicted distance traversed by the sailboat when traveling at the calculated present speed for a time period equal to the expiration time of the countdown timer, and
updating, by one or more processors, the displayed predictor line based upon changes in the calculated present speed of the sailboat such that the displayed predictor line has a first color when the predicted distance is less than or equal to the distance between the sailboat and the starting line, and has a second color when the predicted distance is greater than the distance between the sailboat and the starting line.

18. The computer-implemented method of claim 17, further comprising:
measuring, by a sensor, a wind direction,
generating, by the sensor, a wind data,
calculating, by one or more processors, a port layline angle and a starboard layline angle based upon the wind data, and
displaying, by one or more processors, a port layline at the calculated port layline angle extending from each end of the boundary line, and
displaying, by one or more processors, a starboard layline at the calculated starboard layline angle extending from each end of the boundary line.

19. The computer-implemented method of claim 18, further comprising:
calculating, by one or more processors, a length of the port layline from each respective end of the boundary line based upon a distance traversed by the sailboat tacking at the port layline angle for a selected target time period at a target sailboat speed, and
calculating, by one or more processors, a length of the starboard layline from each respective end of the boundary line based upon a distance traversed by the sailboat tacking at the starboard layline angle for the selected target time period at a target sailboat speed.

20. The computer-implemented method of claim 19, further comprising:
displaying, by one or more processors, a port guideline connecting the end of each port layline extending from each end of the boundary line;
displaying, by one or more processors, a starboard guideline connecting the end of each starboard layline extending from each end of the boundary line; and
updating, by one or more processors, the length of each port layline, the angle of each port layline, the length of each starboard layline, the angle of each starboard layline, the port guideline, and the starboard guideline as the wind data indicates changes in the wind direction.

\* \* \* \* \*